US011854387B2

(12) United States Patent
Sze et al.

(10) Patent No.: US 11,854,387 B2
(45) Date of Patent: *Dec. 26, 2023

(54) REDUCING VEHICULAR CONGESTION AT AN INTERSECTION (71) Applicant: GOOGLE LLC, Mountain View, CA (US)

(72) Inventors: Cliff Chin Ngai Sze, Mountain View, CA (US); Catherine Cardinal, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,037

(22) Filed: Jul. 5, 2022

(65) Prior Publication Data

US 2022/0351615 A1 Nov. 3, 2022

Related U.S. Application Data (63) Continuation of application No. 17/256,000, filed as application No. PCT/US2018/046970 on Aug. 17, 2018, now Pat. No. 11,380,194.

(51) Int. Cl.
G08G 1/01 (2006.01)
B60W 30/18 (2012.01)

(52) U.S. Cl.
CPC ..... *G08G 1/0145* (2013.01); *B60W 30/18154* (2013.01); *G08G 1/0116* (2013.01); *G08G 1/0133* (2013.01)

(58) Field of Classification Search
CPC .. G08G 1/0145; G08G 1/0116; G08G 1/0133; G08G 1/22; G08G 1/096783; G08G 1/096725; B60W 30/18154
See application file for complete search history.

(56) References Cited

U.S. PATENT DOCUMENTS 5,197,008 A    3/1993  Itoh et al.
6,765,495 B1   7/2004  Dunning et al.
(Continued)

FOREIGN PATENT DOCUMENTS

CN    106971580 A    7/2017
CN    107084733 A    8/2017
(Continued)

OTHER PUBLICATIONS

First Office Action for Chinese Application No. 201880095237.9, dated Jul. 5, 2022.

(Continued)

*Primary Examiner* — John A Tweel, Jr.
(74) *Attorney, Agent, or Firm* — MARSHALL, GERSTEIN & BORUN LLP (57) ABSTRACT To control vehicular congestion at intersections, a method includes detecting a group of two or more vehicles stopped at an intersection regulated by a traffic light, where for each of the vehicles in the group, movement through the intersection in response to a change in a state of the traffic light is affected by movement of at least one other vehicle in the group. The method further includes determining a time when the state of the traffic light changes to allow the group of vehicles to start moving through the intersection, determining acceleration parameters for a certain vehicle in the group in view of potential and/or actual movement of the other vehicles in the group through the intersection, and providing guidance to a device operated by a driver of the certain vehicle regarding the determined acceleration parameters, in accordance with the determined time.

20 Claims, 8 Drawing Sheets

(56) References Cited

U.S. PATENT DOCUMENTS

| | | | |
|---|---|---|---|
| 6,989,766 B2 | 1/2006 | Mese et al. | |
| 7,167,104 B2 | 1/2007 | DiPiazza | |
| 7,382,274 B1 | 6/2008 | Kermani et al. | |
| 9,333,971 B1 | 5/2016 | Han | |
| 9,547,986 B1 | 1/2017 | Curlander et al. | |
| 9,773,411 B2 | 9/2017 | Popple | |
| 9,824,583 B2 | 11/2017 | Popple | |
| 11,084,489 B2* | 8/2021 | Ogino | B60W 30/143 |
| 11,380,194 B2* | 7/2022 | Sze | G08G 1/0116 |
| 2005/0187701 A1 | 8/2005 | Baney | |
| 2010/0060482 A1 | 3/2010 | Emam et al. | |
| 2010/0109421 A1 | 5/2010 | Kraemer | |
| 2010/0256852 A1 | 10/2010 | Mudalige | |
| 2012/0095641 A1 | 4/2012 | Merk | |
| 2013/0060456 A1 | 3/2013 | Pourparhizkar | |
| 2013/0063281 A1 | 3/2013 | Malaska | |
| 2013/0179025 A1 | 7/2013 | Deng et al. | |
| 2015/0199904 A1 | 7/2015 | Lee et al. | |
| 2016/0229409 A1 | 8/2016 | Pascheka et al. | |
| 2017/0084172 A1 | 3/2017 | Rolle et al. | |
| 2018/0126995 A1 | 5/2018 | Caballero De Ita et al. | |

FOREIGN PATENT DOCUMENTS

| | | |
|---|---|---|
| CN | 108074408 A | 5/2018 |
| CN | 108335506 A | 7/2018 |

OTHER PUBLICATIONS

Clement et al., "The Simple Platoon Advancement Model of ITS Technologies Applied to Vehicle Control at Signalised Intersections," J. Advanced Transportation, 40(1): 1-21 (2005).

Clement et al., "Towards investigating vehicular delay reductions at signalised intersections with the SPA System," 26th Australasian Transport Research Forum Wellington, New Zealand (2003).

Dresner et al., "A Multiagent Approach to Autonomous Intersection Management," J. Artificial Intelligence Res. 31: 591-656 (2018).

Ebadighajari, "Vehicle Control in Cooperative Driving," Master's Thesis, Chalmers University of Technology (2012).

Ge et al., "Dynamics of connected vehicle systems with delayed acceleration feedback," Transportation Research Part C 46: 46-64 (2014).

Guo, "Cooperative Adaptive Cruise Control (CACC) in the Context of Vehicle to Vehicle Communications: An Overview," Presentation, National Center for Sustainable Transportation (2017).

International Search Report and Written Opinion for Application No. PCT/US2018/046970, dated Jul. 16, 2019.

Jin et al., "Platoon-based multi-agent intersection management for connected vehicles," 16th International IEEE Conference on Intelligent Transportation Systems (2013).

Katsaros et al., "Application of Vehicular Communications for Improving the Efficiency of Traffic in Urban Areas," Wirel. Commun. Mob. Comput., 11:1657-1667 (2011).

Kjellberg et al., "Implementing control algorithms for platooning based on V2V communication," Master's Degree Project, KTH Royal Institute of Technology (2011).

Pincus, "Eco-Driving using Wireless V2I Communications at Signalized Intersections (Presentation)," (2015).

Rungta, "System Level Impacts of V2X Enabled Vehicle Control Strategies," Master's Thesis, Rochester Institute of Technology (2018).

Shladover et al., "Using Cooperative Adaptive Cruise Control (CACC) to Form High-Performance Vehicle Streams: Definitions, Literature Review, and Operational Concept Alternatives," (2014).

Tiernan et al., "Test and Evaluation of Vehicle Platooning Proof-Of-Concept Based on Cooperative Adaptive Cruise Control (Final Report)," (2017).

Varada, "Distributed Cooperative Control of Heterogeneous Multi-Vehicle Platoons," Master's Thesis, University of Rhode Island (2017).

Wang et al., "V2I-based startup assistance system at signalized intersections," Advances in Mechanical Engineering, vol. 7(8): 1-11 (2015).

First Examination Report for India Application No. 202047055119, dated Aug. 31, 2021.

* cited by examiner

REDUCING VEHICULAR CONGESTION AT AN INTERSECTION

FIELD OF THE DISCLOSURE

The present disclosure relates to navigation applications and, in particular, to providing guidance to vehicles or devices operating in vehicles stopped at an intersection.

BACKGROUND

Today, digital maps of geographic areas and step-by-step directions for navigating through geographic areas by driving, walking, bicycling, or riding on public transport can be provided on numerous electronic devices such as personal computers, tablets, mobile phones, navigators provided as special-purpose devices or embedded into head units of vehicles, etc. The digital maps and/or navigation directions can be provided via special-purpose mapping applications or "apps," for example. Typical driving navigation directions advise drivers to make turns on certain streets, drive straight for certain distances, merge onto certain roads, etc.

When going through intersections (or "crossroads") or generally any traffic lights or other road junctions, which are known to be one of the major sources of traffic congestion, drivers typically rely on their experience to decide when and how fast they should accelerate. The information available to drivers generally is limited to what they see in front of them and behind them in the rear-view mirror. As a result, many drivers leave more space than necessary between their vehicles and the vehicles directly in front. Moreover, vehicles accelerate at different rates due to the differences in torque. One result of sub-optimal human decisions and the differences in vehicle capability is that fewer vehicles move through a typical intersection per unit of time than possible. For example, a certain traffic light can display green for 90 seconds and allow approximately 300 vehicles to pass through the intersection at a normal speed, but only 200 vehicles may pass through the intersection during a typical green phase.

SUMMARY

One example embodiment of the techniques of this disclosure is a method for controlling vehicular congestion at intersections. The method comprises detecting, by one or more processors, a group of two or more vehicles stopped at an intersection regulated by a traffic light, such that for each of the vehicles in the group, movement through the intersection in response to a change in a state of the traffic light is affected by movement of at least one other vehicle in the group. The method further comprises determining, by the one or more processors, a time when the state of the traffic light changes to allow the group of vehicles to start moving through the intersection, determining, by the one or more processors, acceleration parameters for a certain vehicle in the group in view of potential and/or actual movement of the other vehicles in the group through the intersection, and providing, by the one or more processors, guidance to a device operated by a driver of the certain vehicle regarding the determined acceleration parameters, in accordance with the determined time.

Another example embodiment of the techniques of this disclosure is a portable computing device comprising one or more processors, a short-range communication interface to communicatively couple the portable computing device to a vehicle, a long-range communication interface to communicatively couple the portable computing device to a vehicle, and a non-transitory computer-readable medium storing instructions. The instructions, when executed by the one or more processors, cause the portable computing device to execute the method above.

Yet another example embodiment of the techniques of this disclosure is a network server comprising one or more computing devices and a non-transitory computer-readable medium storing instructions. The instructions, when executed by the one or more computing devices, cause the network server to execute the method above.

Still another example embodiment of the techniques of this disclosure is a computing system comprising one or more processors and a non-transitory computer-readable memory storing instructions. When executed by the one or more processors, the instructions cause the computing system to detect a group of two or more vehicles stopped at an intersection regulated by a traffic light, such that for each of the vehicles in the group, movement through the intersection in response to a change in a state of the traffic light is affected by movement of at least one other vehicle in the group; determine a time when the state of the traffic light changes to allow the group of vehicles to start moving through the intersection; determine acceleration parameters for a certain vehicle in the group in view of potential and/or actual movement of the other vehicles in the group through the intersection; and provide guidance to a device operated by a driver of the certain vehicle regarding the determined acceleration parameters, in accordance with the determined time.

DETAILED DESCRIPTION

Overview

Generally speaking, a congestion control system of this disclosure coordinates acceleration between vehicles at a traffic light so that the vehicles travel through the intersection efficiently and safely. The system thus improves throughput of traffic at an intersection, which in turn allows vehicles to reach their destinations faster and with lower energy consumption and/or vehicle emissions. To synchronize acceleration, the system can determine which vehicles can define a group (or cluster) and provide guidance to smartphones or other suitable computing devices operating in these vehicles, or directly to the vehicles in some cases.

When multiple autonomous, or "self-driving," vehicles are stopped at an intersection, control units implemented in these autonomous vehicles can exchange messages using a suitable wireless communication standard to form an ad hoc cluster of autonomous vehicles. The control units then can synchronize movement through the intersection to accelerate at a particular time at the maximum safe rate so as to maintain the shortest safe distance between adjacent vehicles in the cluster. A congestion control system thus can control the movement of each autonomous vehicle in view of the movement of the other autonomous vehicles in the cluster.

Movement of semi-autonomous vehicles, which implement such technologies as adaptive cruise control for example, can be controlled in a similar manner. A typical semi-autonomous vehicle can automatically adjust its speed to maintain a certain safe separation from the vehicle directly ahead. In this case, a congestion control system can be implemented in the control units of the semi-autonomous vehicles in the cluster or in a network device operating outside the cluster to control acceleration and deceleration of the semi-autonomous vehicles through an intersection. Once the semi-autonomous vehicles reach a certain speed or detect any change in the surroundings (e.g., the vehicle in front turns on its right turn signal or "blinker"), the congestion control system can notify the corresponding drivers that they should take back control of the vehicles.

However, even as various types of autonomous and semi-autonomous vehicles are being tested and deployed today, many drivers continue to control their vehicles manually. A congestion control system in this case can generate navigation directions related to the timing and rate of acceleration at an intersection, and provide these navigation directions to devices operating in the vehicles. The congestion control system in these cases does not rely on the ability of a vehicle to automatically adjust its speed.

In one example implementation, the congestion control system of this disclosure detects when multiple vehicles approach an intersection or already have reached the intersection, from a certain direction. The detection can be based on sensors operating in the vehicles (cameras, radars, lidars, etc.), sensors operating as components of an urban infrastructure (e.g., cameras mounted on traffic lights), cameras mounted in low-flying drones, cameras mounted in satellites, etc. The congestion control system then organizes at least two of the vehicles into a cluster. The cluster in some cases is only conceptual, as discussed below, and the vehicles or the portable devices operating in these vehicles are not always informed of being organized into a cluster. For example, the congestion control system can organize vehicles in a left-only lane into one cluster, vehicles in the right lane headed straight into another cluster, etc. The congestion control system in some cases can infer the "intent" of a vehicle from navigation directions provided to a portable device operating in this vehicle via a corresponding software application, or from the turn signal currently activated in the vehicle.

Once the congestion control system identifies a cluster of vehicles, the congestion control system determines, for a certain vehicle in the cluster, suitable acceleration parameters in view of the potential or actual movement of the other vehicles in the cluster. The congestion control system in some cases can use additional signals to determine these parameters, e.g., types of the vehicles in the cluster, the current weather conditions, the current lighting conditions. The congestion control system then provides this information to the vehicle in any suitable format or to a portable device operating in the vehicle in the form of text or audio instructions. The acceleration parameters can specify the time of acceleration and, in some implementations, also the rate of acceleration. The congestion control system can determine these acceleration parameters so as to cause the vehicles in the cluster to reach a certain speed more quickly and/or in a more environment-friendly manner, all the while maintaining a safe distance between the vehicles.

In one example scenario, a user of a navigation service receives step-by-step driving directions, including real-time updates, via a software application running on a smartphone while the user is driving. When the user's vehicle is stopped at an intersection, the user may see only the car in front and, in the rear-view mirror, only one car behind. On the other hand, the congestion control system determines which vehicles will affect the timing and the rate of acceleration of the user's vehicle when the traffic light changes. These vehicles can define an ad hoc cluster and can include vehicles separated from the user's vehicle by multiple intervening vehicles. The congestion control system then generates an appropriate instruction and provides the instruction to the user via the application running on the smartphone. For example, the instruction may include a countdown to the time the user should start accelerating as well as a warning regarding the safe rate of acceleration. As another example, the congestion control system can provide an estimate of when the vehicle in front of the user's vehicle will start moving.

In another example scenario, more than one user in the ad hoc cluster including the user's vehicle operates the software application associated with the navigation service. The congestion control system in this case coordinates the acceleration of these vehicles. More particularly, the system can first provide acceleration instructions to the smartphone in the vehicle disposed closer to the intersection, and then provide acceleration instructions to the smartphone in the vehicle farther away to the intersection.

Example Computing Environment

Figure 1:
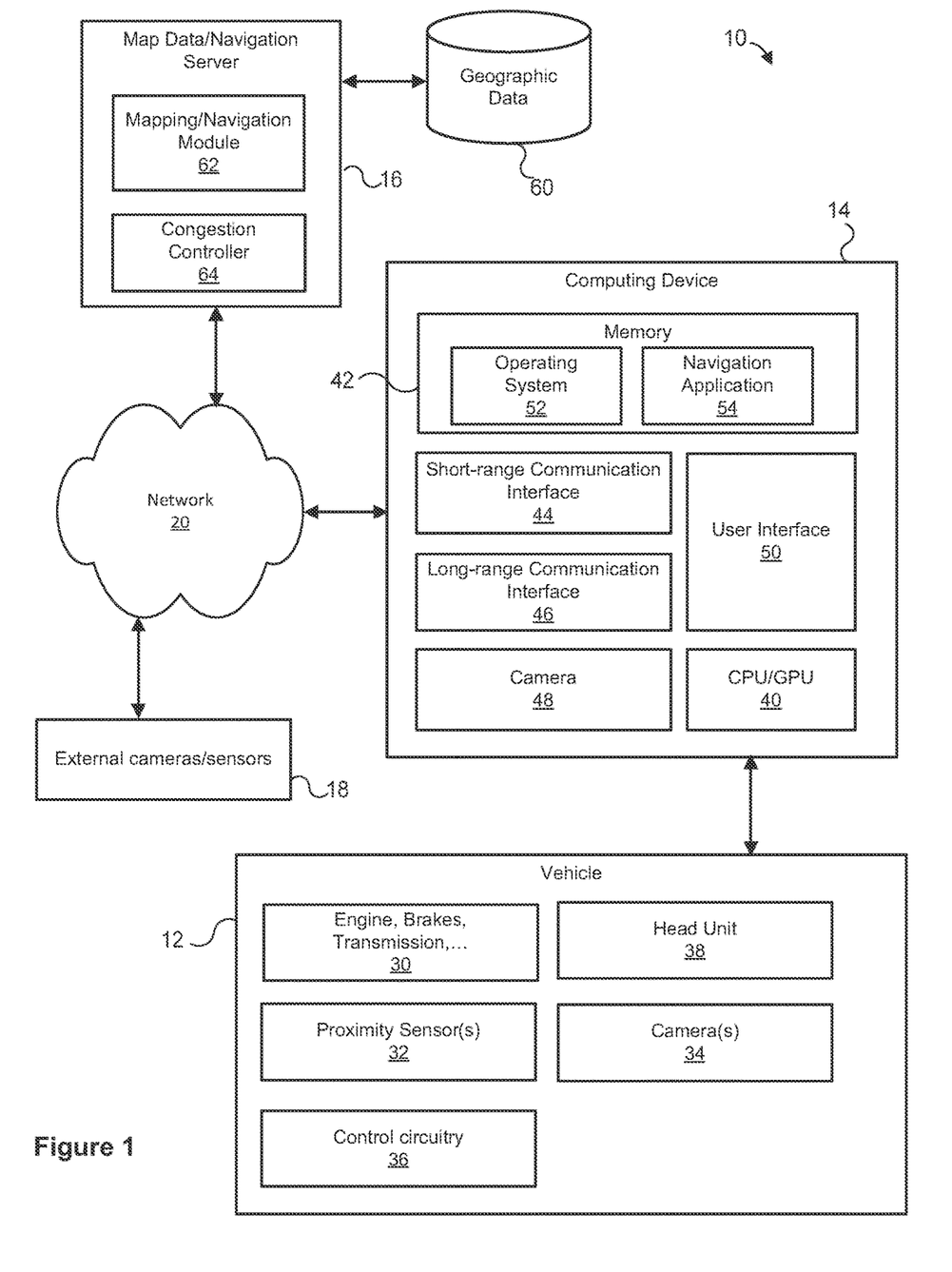
FIG. 1 is a block diagram of an example system in which techniques for reducing congestion can be implemented.

Referring to FIG. 1, an example environment 10 in which the techniques outlined above can be implemented includes a vehicle 12, a computing device 14 operating in the vehicle, and a server 16 that provides mapping and navigation services. The example environment 10 in some cases can include one or more external cameras/sensors 18 that in turn can include one or more cameras, radars, lidars, infrared or thermal imaging devices, etc., or any suitable combination of these devices. The server 16 can communicate with the computing device 14 and the one or more external cameras/sensors 18 via a communication network 20, which can be a wide area network such as the Internet.

The vehicle 12 in the scenario of FIG. 1 can be a non-autonomous, i.e., a conventional, vehicle or a semi-autonomous vehicle. In addition to an engine, a transmission, brakes, etc. 30, the vehicle 12 can be equipped with sensors such as one or more proximity sensors 32 and one or more cameras 34. A control circuitry 36 can be configured to detect whether vehicles are present within a certain distance immediately ahead of the vehicle 12 and/or immediately behind the vehicle 12, using the proximity sensor(s) 32 and/or the camera(s) 34. In some implementations, the vehicle circuitry 34 also determines the approximate distance to these vehicles (e.g., 10 feet, 12 feet, 50 feet). The vehicle 12 also can include a head unit 38 equipped with input and output devices such as a touchscreen, a speaker, a microphone, etc.

Further, the head unit 38 in one example embodiment is equipped with a wireless communication module that supports a Bluetooth™—based wireless personal area network (WPAN) to communicate with proximate electronic devices such as the computing device 14 for example. The head unit 38 also can be configured to measure the signal strength for Bluetooth beacons transmitted from nearby vehicles to determine approximate distances to these vehicles.

The computing device 14 can be for example a portable device such as a smartphone, a tablet computer, or a wearable device such as a smartwatch. The computing device 14 alternatively can be a special-purpose car navigator or an electronic device embedded in the head unit of the vehicle 12. In the example implementation of FIG. 1, the computing device 14 includes one or more processing units 40 which can include a central processing unit (CPU), a graphics processing unit (GPU), etc. The computing device 14 further includes a non-transitory memory 42 that can include random access memory (RAM), read-only memory (ROM), flash memory, other types of persistent memory, etc. The memory 42 can store instructions that implement an operating system (OS) 52, which can be any suitable mobile or general-purpose operating system, and a navigation application 54. The computing device 14 also can include a short-range communication interface 44, a long-range communication interface 46, a camera 48, and a user interface 50.

The short-range communication interface 44 can support communications via a wireless personal area network (WPAN) such as Bluetooth, a wireless local area network (WLAN) such as WiFi™, a wired connection such as Universal Serial Bus (USB), etc. The computing device 14 is coupled to the vehicle 12 via a short-range communication link supported by the short-range communication interface 44, in the example of FIG. 1. The long-range communication interface 46 can support, for example, cellular communications according to various 3G, 4G, 5G, etc. communication standards and/or wide area network communications such as WiFi. The camera 48 can be any suitable charge-coupled device (CCD) or complementary metal-oxide semiconductor (CMOS) camera. In an example scenario, the computing device 14 is mounted on the dashboard of the vehicle 12 so that the camera 48 faces the road ahead of the vehicle 12, and a software application executing on the computing device 14 detects an approximate distance to the vehicle immediately ahead of the vehicle 12.

In addition to the camera 48, the computing device 14 in various embodiments can include sensor components or modules such as a global positioning system (GPS) module to detect the position of the computing device 14, a compass to determine the direction of the computing device 14, a gyroscope to determine the rotation and tilt, an accelerometer, etc.

The user interface 50 can include any suitable combination of input devices such as a touchscreen, a keyboard, a microphone, etc. and output devices such as screens, speakers, etc. In operation, the navigation application 54 can receive instructions from the user and provide navigation directions in the form of text, images, videos, vocalized instructions, etc. via the user interface 50. The navigation application 54 can provide an interactive digital map via the user interface 50. The navigation application 54 in some cases can operate in a projected mode and direct some or all of the output to an external device such as the head unit 38.

The navigation application 54 can receive map data in a raster (e.g., bitmap) or non-raster (e.g., vector graphics) format from the server 16. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The navigation application 54 can provide navigation directions as a graphic overlay on a digital map, as a sequence of instructions that include text and/or images, as a set of vocalization instructions via speakers, or any suitable combination thereof.

With continued reference to FIG. 1, the server 16 can be operated by a provider of mapping and navigation services. The server device 16 can provide map data and navigation data to the computing device 14 and other client devices. The server device 16 can be communicatively coupled to a database 60 that stores geographic data including map data for various geographic areas. The map data can be stored in any suitable format such as vector graphics, rasterized images, text for labels, etc. and organized according to any suitable principle (e.g., square map tiles covering the same amount of area at a certain zoom level). The map data can specify the shapes and various properties of geographic features such as roads, buildings, lakes, rivers, parks, etc. The map data also can include street-level imagery and photographs taken from various vantage points. Further, map data for geographic areas can include information about brick-at-mortar businesses located at the respective locations within the geographic area: hours of operation, description of products and services, user reviews, etc. The geographic data in the database 60 also can store data related to roads and lanes such as indications of which lanes at certain intersections are left-turn-only lanes, right-turn-only lanes, etc. As discussed below, the system can use road and lane data when defining clusters of vehicles at intersections.

The server 16 can implement a mapping/navigation module 62 and a congestion controller 64. Each of the modules 62 and 64 can be implemented as a set of instructions stored in a memory that includes non-transitory medium such as a hard disk, a flash drive, etc., and executable by one or more processors of the server 16.

For simplicity, FIG. 1 illustrates the server device 16 as only one instance of a server. However, the server device 16 according to some implementations includes a group of one or more server devices, each equipped with one or more processors and capable of operating independently of the other server devices. Server devices operating in such a group can process requests from the client computing device 14 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

The one or more external cameras/sensors 18 can operate in any suitable structure, vehicle, aircraft, etc. For example, the one or more external cameras/sensors 18 can be installed on traffic lights, light posts, walls of buildings, etc. In other scenarios, the one or more external cameras/sensors 18 can operate in unmanned aerial vehicles (UAVs) or satellites. In any case, imagery captured by the one or more external cameras/sensors 18 can be processed to determine locations of vehicles, spacing between vehicles, types of vehicles (e.g., a car, a van, a truck). This imagery in some cases also can be used to determine the state of the traffic light.

In some embodiments, the server 16 can receive real-time data related to the state of traffic lights from a dedicated electronic service. For example, a certain municipality may expose an API using which software systems can determine the current state of a selected traffic light, the time remaining in the current state, the expected duration of the next state, etc.

Using the data stored in the database 60, the mapping/ navigation module 62 can generate routes traversing geographic areas and navigation instructions to guide drivers along the generated routes. The congestion controller 64 can augment these navigation instructions with guidance for efficiently traversing intersections, as discussed in more detail below. In some embodiments, the functionality of the congestion controller 64 can be implemented partially or fully in the navigation application 54 or multiple instances of the navigation application 54. More particularly, multiple instances of the navigation application 54 operating in different respective devices (which in turn are disposed in different respective vehicles) can exchange information with each other to cooperatively determine the acceleration parameters for the corresponding vehicles.

Guiding Vehicles Through Intersections

Figure 2:
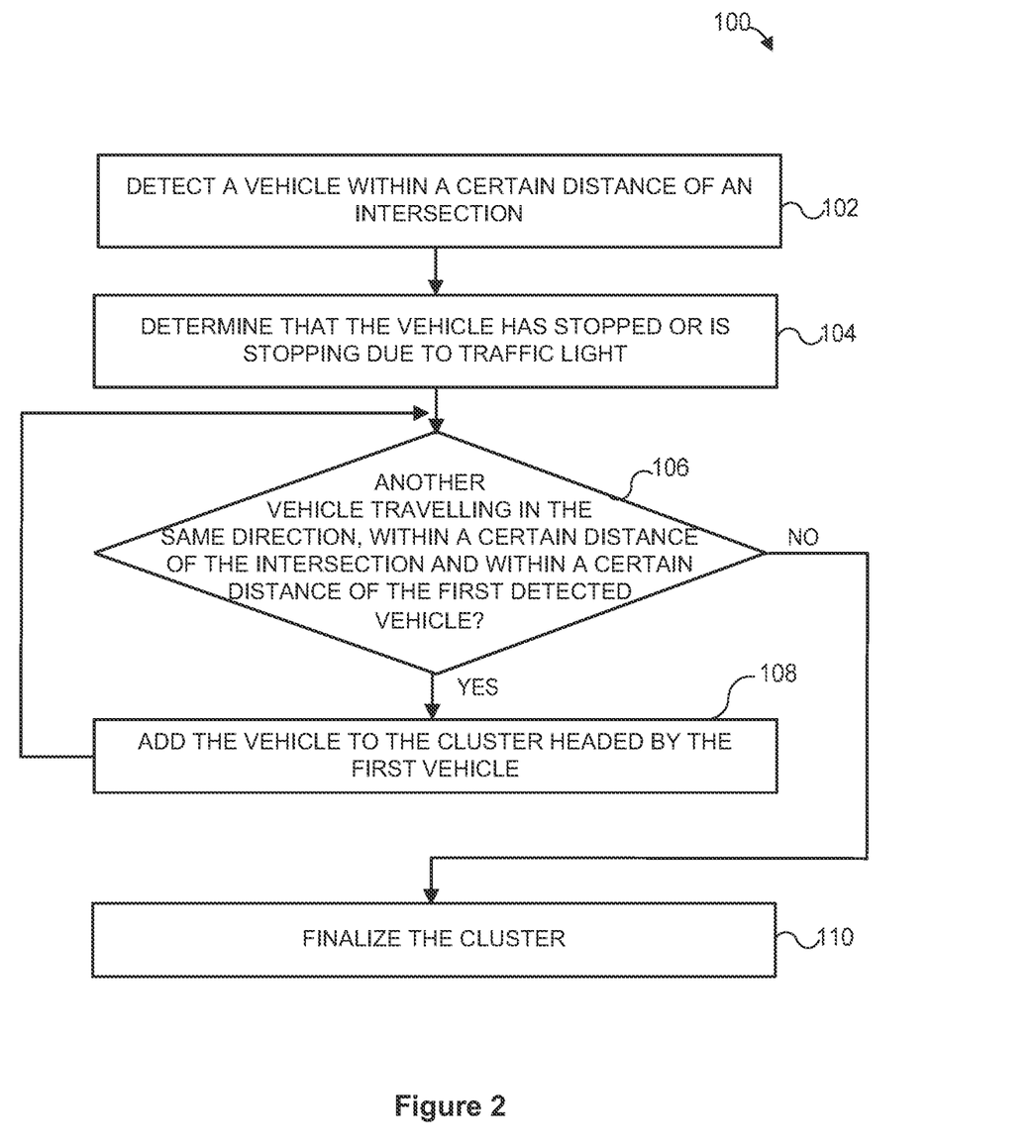
FIG. 2 is a flow diagram of an example method for identifying a group (or "cluster") of vehicles at an intersection for coordinated guidance through the intersection, which can be implemented in the system of FIG. 1.

Now referring to FIG. 2, an example method 100 for identifying a group (or "cluster") of vehicles at an intersection for coordinated guidance through the intersection can be implemented as a set of instructions executable by one or more processors. These instructions can be included in the congestion controller 64, the navigation application 54, or partially in the congestion controller 64 and partially in the navigation application 54. Further, the method 100 in some embodiments is implemented in the head unit 38. For clarity, the method 100 is discussed below with reference to a congestion control system that can include one or more of: (i) the congestion controller 64, (ii) one or more instances of the navigation application 54, and (ii) one or more instances of the control circuitry 36.

Figure 3:
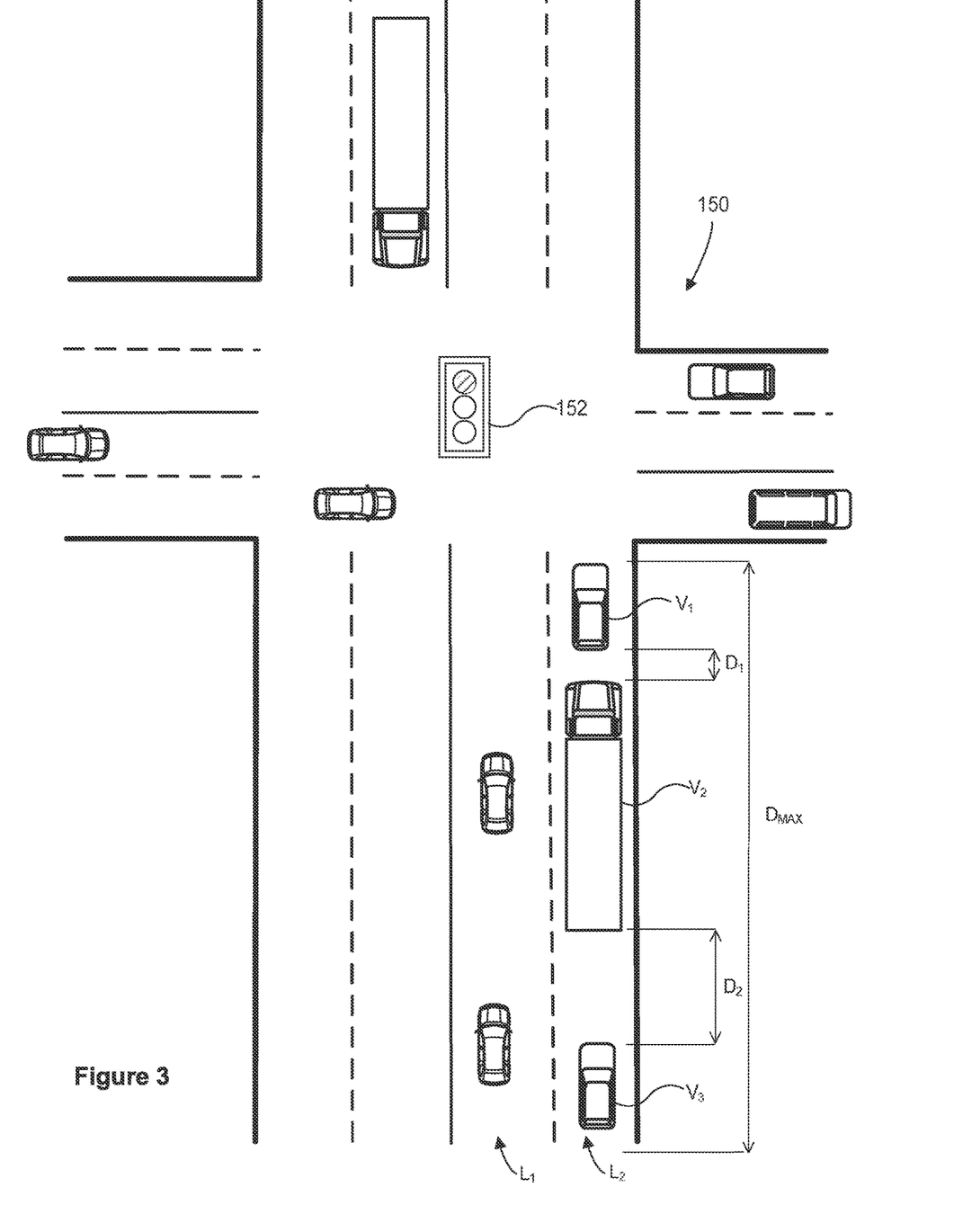
FIG. 3 is a diagram of an example scenario in which the system of FIG. 1 can identify a cluster of vehicles for coordinated guidance through an intersection.

At block 102, the congestion control system detects a vehicle within a certain distance of an intersection. Referring to FIG. 3, for example, each of the vehicles $V_1$, $V_2$, and $V_3$ is within a distance $D_{MAX}$ of an intersection 150 controlled by a traffic light 152. The congestion control system first can determine that the vehicle $V_1$ is proximate to the intersection 150.

As one specific example, a portable computing device similar to the device 14 of FIG. 1 can operate in the vehicle $V_1$. An instance of the navigation application 54 running on the portable device can receive, from a navigation service, a description of a route to a certain destination along with step-by-step navigation instructions. The description of the route can include locations of intersections. The positioning module operating in the vehicle $V_1$, which can rely on GPS or WiFi signals for example, can determine at some point that the vehicle $V_1$ is within the distance $D_{MAX}$ of the intersection 150.

Referring back to FIG. 2, the congestion control system at block 104 can determine that the vehicle has stopped, or is about to stop, at the intersection. To continue with the example above, the portable device operating in the vehicle $V_1$ can determine that the current speed of the vehicle $V_1$ is below a certain threshold $v_T$ (e.g., 5 mph, 3 mph) using the positioning module of the portable device or based on one or more sensors of the vehicle $V_1$.

The congestion control system also can determine whether the vehicle is stopped at the intersection due to the state of the traffic light. The congestion control system can refrain from forming a cluster of vehicles at the intersection (or form a different type of cluster) if the vehicle is stopped due to traffic congestion or some other reason. In some embodiments, the congestion control system attempts to form a cluster of vehicles only in response to determining a transition of the traffic light from red to green. For example, the congestion control system can rely on the dashboard camera of the vehicle with a clear view of the traffic light to detect the changes in the state of the traffic light. In other embodiments, the congestion control system attempts to form a cluster of vehicles in advance of the transition of the traffic light from red to green. As indicated above, the congestion control system can obtain an indication of not only the current state of the traffic light but also of when the traffic light will change from red to green.

Next, at block 106, it is determined whether another vehicle can be added to the cluster. The congestion control system can determine for example whether there is another vehicle that is traveling in the same direction and is within the certain distance of the intersection. In some cases, the congestion control system can impose the additional requirement that the other vehicle be in the same lane. In other cases, the congestion control system can determine that lanes from multiple vehicles can be clustered due to lane merging, for example, as discussed with reference to FIG. 5. Referring again to FIG. 3, the congestion control system can determine that the vehicle $V_2$ is in the same lane $L_2$ as the vehicle $V_1$, and that the vehicle $V_1$ is within the distance $D_{MAX}$ of the intersection 150.

Another requirement the congestion control system can impose is a certain maximum separation $d_T$ between adjacent vehicles in the cluster. The congestion control system can determine that the vehicles $V_1$ and $V_2$ are separated by a gap of length $D_1$, and that $D_1$ is smaller than $d_T$.

The congestion control system can approximately measure the gap $D_1$ between the vehicles $V_1$ and $V_2$ using sensors internal to these vehicles or portable devices operating in these vehicles, external to these vehicles or the portable devices, or any suitable combination of both. As discussed above with reference to FIG. 1, the control circuitry 36 embedded in the vehicle can determine approximate distances to other vehicles and/or other objects on the road immediately ahead of the vehicle and immediately behind the vehicle using the proximity sensor(s) 32 and/or the camera(s) 34. In another embodiment, the congestion control system can determine the spacing between vehicles in a cluster using the external cameras/sensors 18. In yet another embodiment, the congestion control system can use positioning data, such as GPS data for example, obtained by the portable devices disposed in the vehicles. More particularly, the OS 52 can automatically determine when the computing device 14 operates in a vehicle, and users can configure their portable devices so that during driving, these devices provide positioning data, in an anonymized manner, to the congestion control system for the specific purpose of determining gaps between vehicles. In another embodiment, the portable devices determine approximate distances to nearby portable devices operating in vehicles based on signal strength measurements for Bluetooth or WiFi beacons.

If it determined at block 106 that another vehicle satisfies the one or more conditions for entry into the cluster, the flow proceeds to block 108, where the congestion control system adds this vehicle to the cluster. In the example above, the congestion control system can add the vehicle $V_2$ to the cluster $C_1$, so that $C_1$ becomes $\{V_1, V_2\}$. The flow then returns to block 106. The congestion control system similarly can determine that vehicle $V_3$ is in the same lane $L_2$ as the vehicle $V_1$, that the vehicle $V_3$ is within the distance $D_{MAX}$ of the intersection 150, and that the vehicles $V_2$ and $V_3$ are separated by gap of length $D_1$, where $D_1 < d_T$. In response to this determination, the congestion control system can add the vehicle $V_3$ to the cluster $C_1$, so that $C_1$ becomes $\{V_1, V_2, V_3\}$.

Otherwise, if it determined at block 106 that no other vehicle satisfies the one or more conditions for being added to the cluster, the flow proceeds to block 110, where the formation of the cluster completes. The congestion control system then can begin to control, or at least affect, movement of an individual vehicle in the cluster in view of movement of the other vehicles in the cluster. For example, the congestion control system can control the time and the rate of acceleration for the vehicle $V_2$ in view of the movement of the vehicle $V_1$, and similarly control the time and the rate of acceleration for the vehicle $V_3$ in view of the movement of the vehicle $V_2$.

The congestion control system thus can form a cluster of vehicles according to the method 100 with or without the vehicles in the cluster communicating with each other. In some implementations, the vehicles $V_1, V_2$, and $V_3$ illustrated in FIG. 3 and/or portable devices operating in these vehicles can form an ad hoc communication network when these vehicles are within the distance $D_{MAX}$ of the intersection 150, are stopped or stopping, and are headed in the same direction. The vehicles to this end can use a WLAN, WPAN, or another suitable communication scheme. This ad hoc communication network can serve the specific purpose of controlling acceleration and spacing between the vehicles in the cluster at the intersection 150, and the communication network can automatically dissolve once the vehicles reach a certain minimum speed and clear the intersection or in response to another event as discussed below. The congestion control system in this case can operate in a distributed manner in the communication network. In other implementations, the congestion control system can identify a cluster and provide guidance to the vehicles without notifying these vehicles of the formation of the cluster. The congestion control system in this embodiment need not rely on any direct communication between the vehicles in the cluster. Moreover, the congestion control system in some embodiments can provide guidance to vehicles based solely on data collected from outside the cluster, e.g., from the external cameras/sensors 18, and need not rely on any data reported by the vehicles or portable devices operating in these vehicles.

Further, the congestion control system need not require that each vehicle in the cluster have the same capability. For example, the vehicle $V_1$ can be an autonomous vehicle, the vehicle $V_2$ can be a conventional vehicle in which the driver currently does not operate a portable device at all, and the vehicle $V_3$ can be a conventional vehicle in which the driver operates a portable device currently executing an instance of the navigation application 54. The congestion control system can provide guidance to the portable device in the vehicle $V_3$ with respect to movement through the intersection in view of what the congestion control system can observe regarding the other vehicles in the cluster, even if the congestion control system cannot provide guidance to the other vehicles and thus cannot coordinate the movement through the intersection between the vehicles in this cluster.

Figure 4:
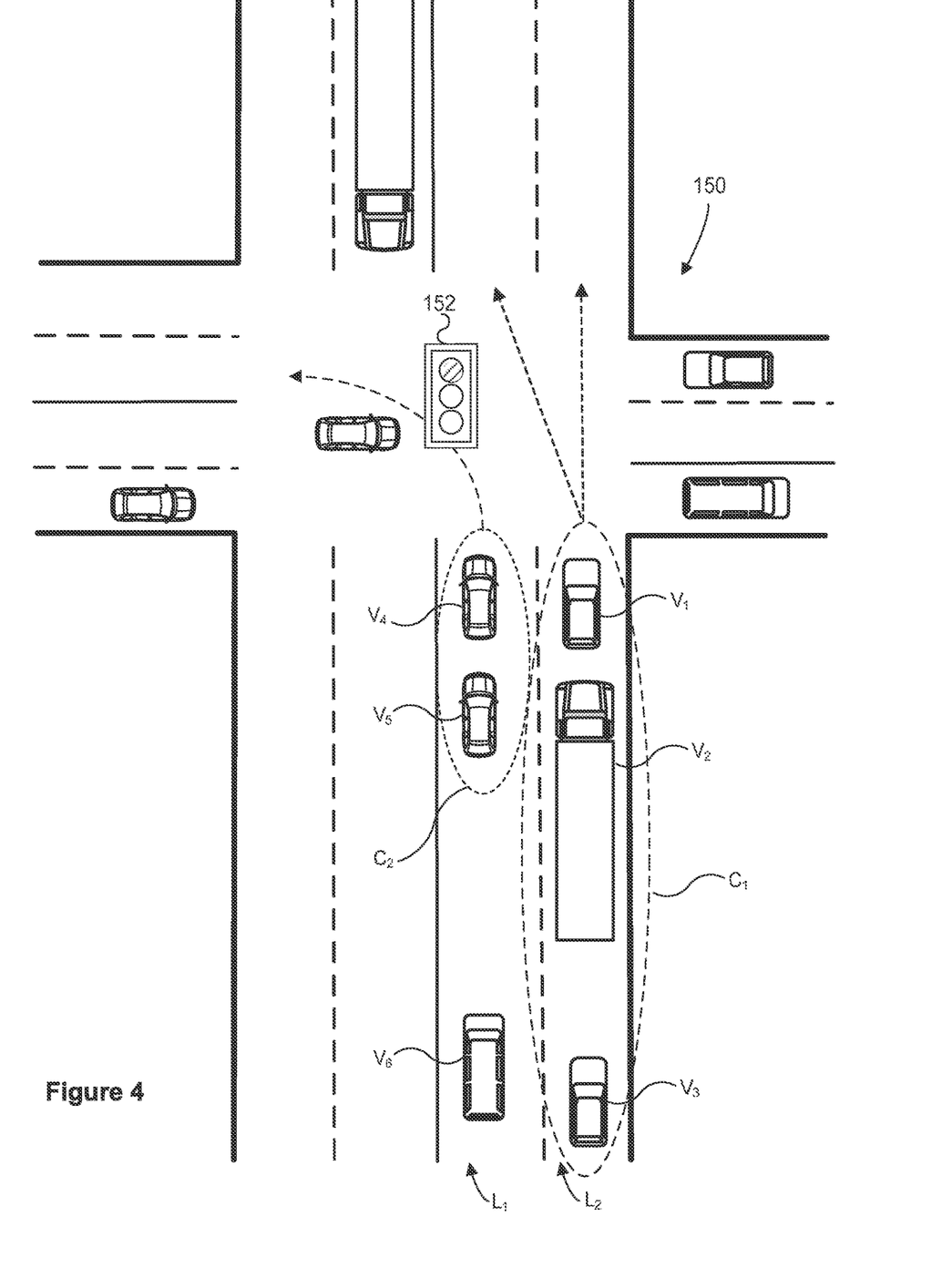
FIG. 4 is a diagram of an example scenario in which the system of FIG. 1 can identify several clusters of vehicles for coordinated guidance through an intersection.

FIG. 4 illustrates another example formation of clusters at an intersection. Vehicles $V_4$ and $V_5$ have either come to a complete stop or are moving at a speed below $v_T$ in lane $L_1$. The congestion control system forms a cluster $C_2 = \{V_4, V_5\}$ upon determining that every condition for forming such a cluster is satisfied. These conditions can include for example the vehicles being within a certain threshold distance of the intersection 150, the traffic light 152 being in the red state, the spacing between the vehicles being within a certain threshold value, and the vehicles being headed in the same direction. Thus, although vehicle $V_6$ is also in the lane $L_1$ and is headed in the same direction, the spacing between the vehicles $V_5$ and $V_6$ is too large, and the congestion control system does not include the vehicle $V_6$ in the cluster $C_2$.

The congestion control system also can determine that the vehicles in the cluster $C_2$ will turn left. The congestion control system can make this determination based on the turn signals activated in the vehicles $V_4$ and $V_5$ or based on the navigation directions provided to the portable devices operating in these vehicles, for example. The congestion control system can determine acceleration parameters in view of whether a cluster of vehicles will move forward through the intersection, turn right, turn left, or make a U-turn.

Figure 5:
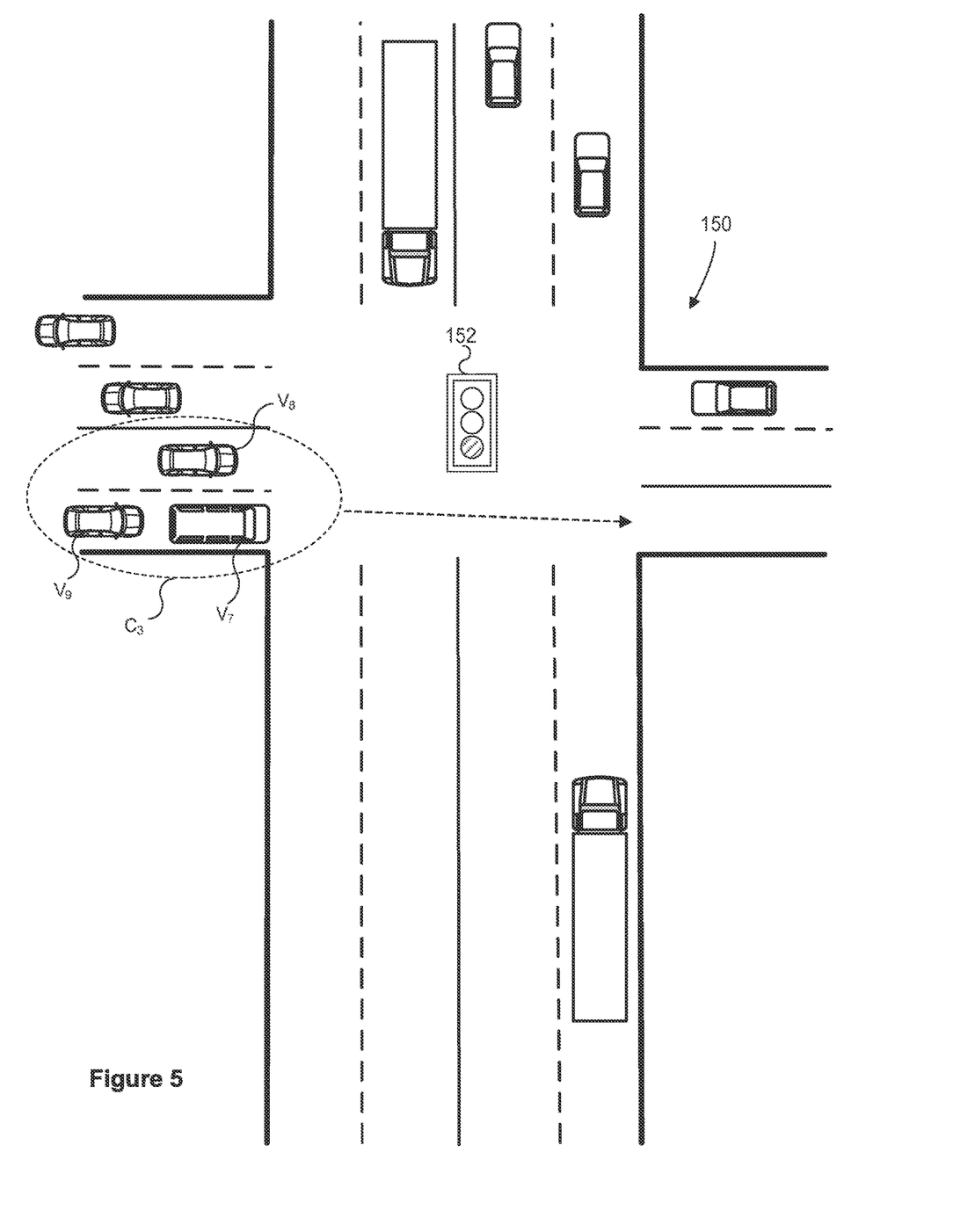
FIG. 5 is a diagram of another example scenario in which the system of FIG. 1 can identify a cluster of vehicles for coordinated guidance through an intersection.

FIG. 5 illustrates still another example of forming a cluster of vehicles at an intersection. In this scenario, the congestion control system forms a cluster $C_4$ including vehicles $V_7, V_8$, and $V_9$, even though the vehicle $V_8$ is in a different lane than the vehicles $V_7$ and $V_9$. The congestion control system determines that the vehicles $V_7, V_8$, and $V_9$ are headed in the same direction, that there is only one lane available for movement in this direction after the intersection 150, and that the vehicles $V_7, V_8$, and $V_9$ thus will need to merge. The congestion control system can adjust the acceleration parameters for the vehicles in the cluster $C_4$ in view of the anticipated merge maneuver.

Figure 6:
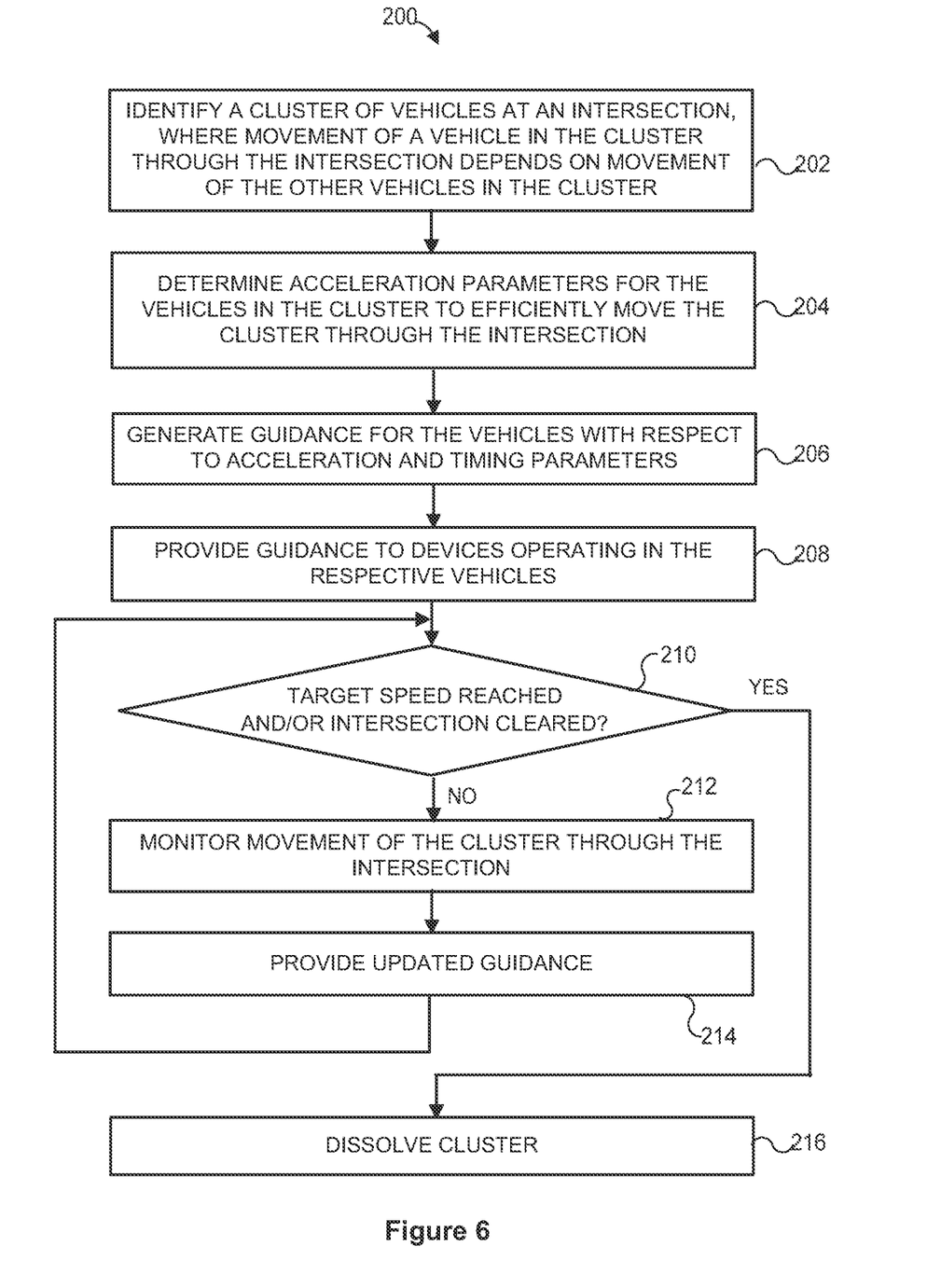
FIG. 6 is a flow diagram of an example method for guiding a cluster of vehicles through the intersection, which can be implemented in the system of FIG. 1.

Next, FIG. 6 illustrates an example method 200 for guiding a cluster of vehicles through an intersection. Similar to the method 100, the method 200 can be implemented as a set of instructions executable by one or more processors, and these instructions can operate in the congestion control system.

Figure 7:
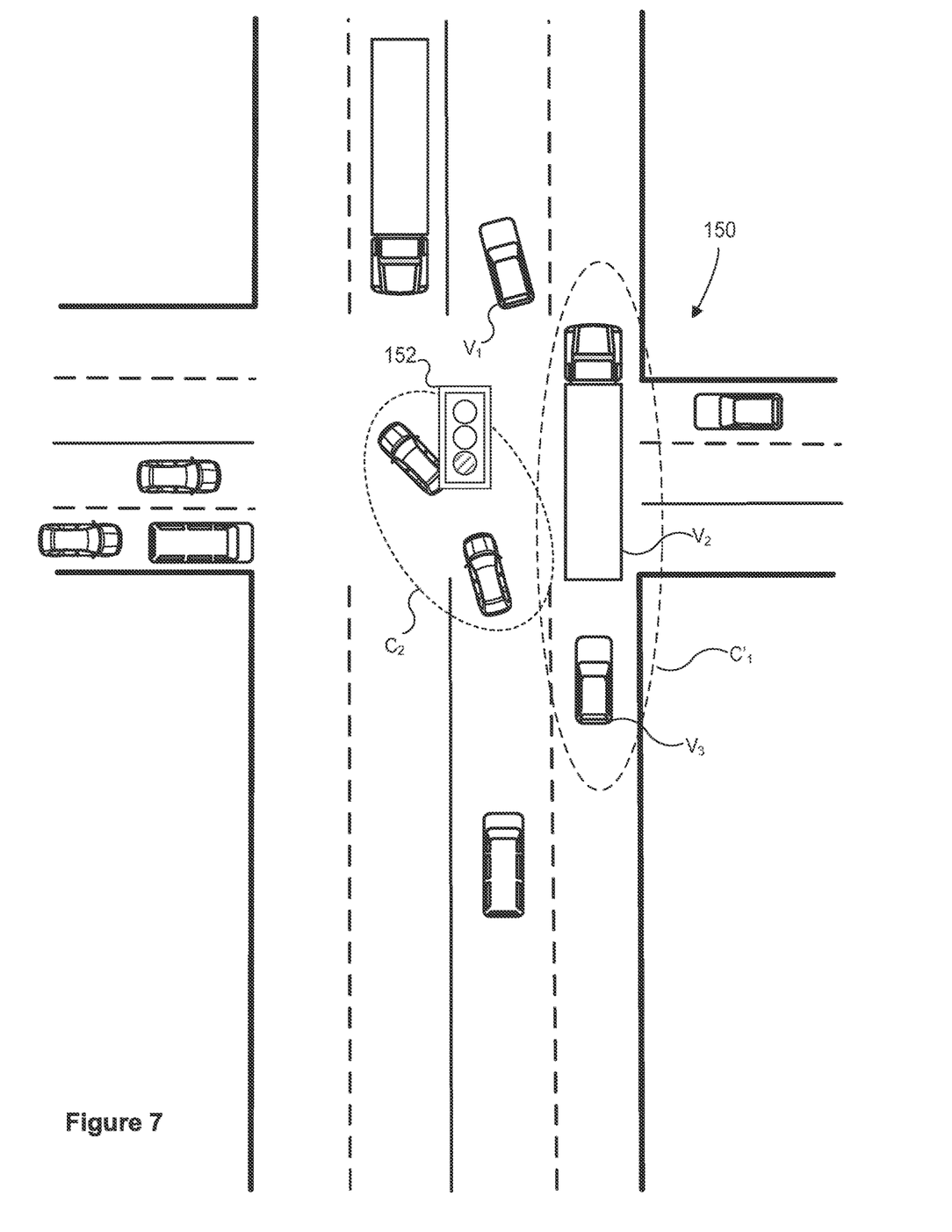
FIG. 7 is a diagram of an example scenario in which the system of FIG. 1 can guide several clusters of vehicles through an intersection.

The method 200 begins at block 202, where a cluster of vehicles is identified. For example, the cluster can be initially identified in accordance with the method 100 discussed above. The make-up of a cluster however need not stay the same during the period when the congestion control system guides vehicles through an intersection. For example, vehicles can enter and leave lanes, turn left or right, etc. The congestion control system can support dynamic clustering to account for these situations. As illustrated in FIG. 7, after the traffic light 152 transitions from red to green and the congestion control system begins guiding the cluster $C_1$ through the intersection 150, the vehicle $V_1$ changes lanes while the vehicle $V_2$ following immediately behind remains in the original lane. The congestion control system accordingly can modify the cluster $C_1$ so that the modified cluster $C'_1$ includes only vehicles $V_2$ and $V_3$.

Referring again to FIG. 6, one or more acceleration parameters for the vehicles in the cluster are determined at block 204. The acceleration parameters in general can include one or more times when the vehicle should modify its speed (e.g., start accelerating at time $t_0$, decrease the rate of acceleration at the speed at time $t_1$), the rate of acceleration (e.g., 3 m/s$^2$, 4 m/s$^2$), etc. As discussed below, the congestion control system in some cases can map these numeric values to instructions with qualitative terms (e.g., "faster," "slower") a driver can follow more easily.

In one embodiment, the parameters determined at block 204 include only the time when the vehicle should start to accelerate, for each of the vehicles in the cluster. The congestion control system can operate according to this embodiment when the vehicles in the cluster do not have any autonomous or semi-autonomous capability: the congestion control system can provide the timing information to the portable devices operated in the corresponding vehicles, and the drivers can accelerate in accordance with their abilities and preferences. The precise timing of acceleration can provide an improvement in traffic throughput at the intersection, even if this improvement is less significant than the improvement due to controlling both the timing and the rate of acceleration.

Referring back to FIG. 4, for example, the cluster $C_1$ includes the vehicles $V_1$ at the head of the queue, the vehicle $V_2$ immediately behind the vehicle $V_1$, and the vehicle $V_3$ immediately behind the vehicle $V_2$. The congestion control system can determine that the cluster $C_1$ can efficiently move through the intersection if the vehicles $V_1$, $V_2$, and $V_3$ accelerate at times $t_1$, $t_2$, and $t_3$, respectively. As a more specific example, the congestion control system can determine that the vehicle $V_1$ should accelerate immediately in response to the traffic light 152 changing to green, that the vehicle will be at a safe distance $d_{safe}$ from the vehicle $V_2$ after $t_2$ amount of time, etc. The congestion control system generally can implement any suitable analytical or numerical technique for estimating the distance a vehicle is expected to cover with a certain acceleration. In another scenario, however, the congestion control system can determine that all vehicles in the cluster should start accelerating at the same time to move through the intersection more efficiently.

In some embodiments, the parameters determined at block 204 include the time when the vehicle should start to accelerate as well as the rate when the vehicle should accelerate, for each of the vehicles in the cluster. According to one such embodiment, the congestion control system provides the rate of acceleration parameter along with the timing parameter to a semi-autonomous vehicle capable of accelerating at a relatively precise rate for a relatively precise amount of time (e.g., "accelerate at 2 m/s$^2$ at time $t_0$=13:58:59.22, for 1.9 seconds"). According to another embodiment, the congestion control system provides the rate of acceleration parameter along with the timing parameter to a conventional vehicle, but maps the numeric values and some quantitative instructions to qualitative instructions the driver can understand, e.g., "accelerate slowly for about two seconds," "accelerate freely until you reach 20 mph."

The congestion control system can determine the one or more acceleration parameters in view of the capability of individual vehicles, in some embodiments. For the example cluster $C_1$, the congestion control system can determine that the vehicle $V_1$ is a sedan and should accelerate relatively quickly, the vehicle $V_2$ is a truck and should accelerate relatively slowly, etc. To this end, the congestion controller 64 or another component of the congestion control system in one embodiment processes the imagery captured by the external cameras/sensors 18 and runs a classifier to determine the types of vehicles. In another embodiment, the congestion control system obtains more precise vehicle data (e.g., make, model) from the vehicles in the cluster $C_1$ and/or the portable devices operating in these vehicles, provided that the user configured the corresponding software applications to provide this data to the congestion control system for the purpose of executing the method 200 or a similar method.

Further, the congestion control system can adjust the one or more acceleration parameters for a certain vehicle in view of what the vehicle, or the driver of the vehicle, cannot see due to the limited vision from the vantage point of the vehicle. In the example scenario of FIG. 4, the driver of the vehicle $V_3$ most likely cannot see the vehicle $V_1$ due to the large size of the truck $V_2$. The congestion control system in some cases may determine that the vehicle $V_1$ may not be able to accelerate quickly (or is not accelerating quickly, after the initial guidance has been provided), and accordingly adjust the one or more acceleration parameters downward for the vehicle $V_3$. In this manner, in addition to improving the efficiency of moving multiple vehicles through an intersection, the congestion control system can provide warnings to drivers regarding slower-than-expected acceleration and thereby improve safety.

Still further, the congestion control system can adjust the one or more acceleration parameters for a certain vehicle depending on how many of the other vehicles in the cluster, or the corresponding portable devices, currently participate in the coordinated movement through the intersection. The congestion control system can project less efficient acceleration for vehicles in the cluster that are not currently receiving guidance from the congestion control system.

The congestion control system in some cases can adjust the one or more acceleration parameters in view of the weather conditions and/or lighting conditions. More particularly, the congestion control system may determine that the vehicles in the cluster should accelerate more slowly if the ambient conditions include rain, snow, or fog. The congestion control system can receive an indication of the current weather conditions at the intersection from a real-time weather service or from the sensors in the vehicles or the portable devices. The congestion control system may determine that the vehicles in the cluster should accelerate more slowly at certain hours at night.

The congestion control system also can adjust the one or more acceleration parameters upon determining that the cluster or a portion of the cluster will make a turn. The guidance the congestion control system provides in these cases can include slower acceleration. The congestion control system can indicate that even lower acceleration is appropriate upon determining that the cluster or a portion of the cluster plans a U-turn. For example, the congestion control system can select the one or more acceleration parameters so that none of the vehicles in the cluster exceeds a certain threshold speed. The threshold speed for the U-turn scenario can have one value, the threshold speed for the left or right turn scenario can have another, higher value, and the threshold speed for the driving straight scenario can have an even higher value. The congestion control system can select and adjust these values in view of the speed limit near the intersection, the weather conditions, the lighting conditions, etc.

With continued reference to FIG. 6, at block 206, guidance is generated for the one or more vehicles in the cluster. As discussed above, the congestion control system can provide semi-autonomous vehicles with instructions that are relatively precise with respect to the time and rate of acceleration.

On the other hand, the congestion control system can generate less precise guidance to a portable device operating in a conventional vehicle. The guidance provided to a conventional vehicle can include textual instructions that can be inserted into the sequence of step-by-step driving directions, imagery, vocalized instructions, etc. In an example embodiment, the congestion controller 64 augments the step-by-step driving directions generated by the navigation module 62, so that the example sequence includes the vocalized instructions "Head North on Oak St.," "turn right on Lake St.," "prepare to start accelerating in 2 seconds," "accelerate freely to 15 mph," "continue driving on Lake St. for two miles," etc.

At block 208, the congestion control system can provide the generated guidance to one, several, or all vehicles in the cluster, at the respective times. These times can be the same or different, depending on what the congestion control system previously determined would result in a more efficient scheme. Not every vehicle in a cluster may be configured to receive guidance from the congestion control system, as discussed above. Further, the congestion control system can provide guidance to different vehicles in different formats, e.g., in one format at one degree of precision for a semi-autonomous vehicle and in a different format at a different degree of precision to a conventional vehicle in the cluster.

The congestion control system can determine whether the vehicle has reached a target speed at block 210. To this end, the congestion control system can use the sensors of the vehicle, the portable device, or imagery collected via a camera external to the cluster. If the vehicle has reached the target speed, the flow can proceed to block 216, where the congestion control system can dissolve the cluster. Otherwise, the flow proceeds to block 212. In another scenario, the congestion control system detects a change in the surroundings or a change related to the cluster of vehicles. Examples of such changes include a vehicle in the cluster activating its turn signal, failure of a vehicle in the cluster to accelerate, a dog running out on the road in front of or near a vehicle in the cluster, etc. The congestion control system in this case proceeds to block 216 to dissolve the cluster or divide the cluster into two or more smaller clusters.

In one example scenario in which the congestion control system divides the cluster, the congestion control system initially forms a cluster of ten vehicles and guides the cluster through an intersection. The driver of the fifth vehicle in the cluster intends to make a right turn into a gas station 1000 feet past the intersection. The driver of this vehicle turns on the right turn signal after driving 500 feet past the intersection. In response to detecting that the right turn signal in the fifth vehicle has been activated, the congestion control system can automatically divide the cluster into three clusters: a first cluster with the four vehicles in front of the fifth vehicle preparing for the turn, a second cluster including only the fifth vehicle preparing for the turn, and a third cluster including the last five vehicles of the original cluster.

At block 212, the congestion control system can monitor the movement of the cluster at block 212. In particular, the congestion control system can ensure that the vehicles maintain a safe distance, that none of the vehicles accelerates too quickly or too slowly, that the make-up of the cluster remains the same, etc. For those vehicles being actively guided, the congestion control system can provide updated guidance at block 214. For example, the congestion control system can generate a vocalized instruction "slow down" or "do not accelerate to a speed above 20 mph." The flow then returns to block 210.

Figure 8:
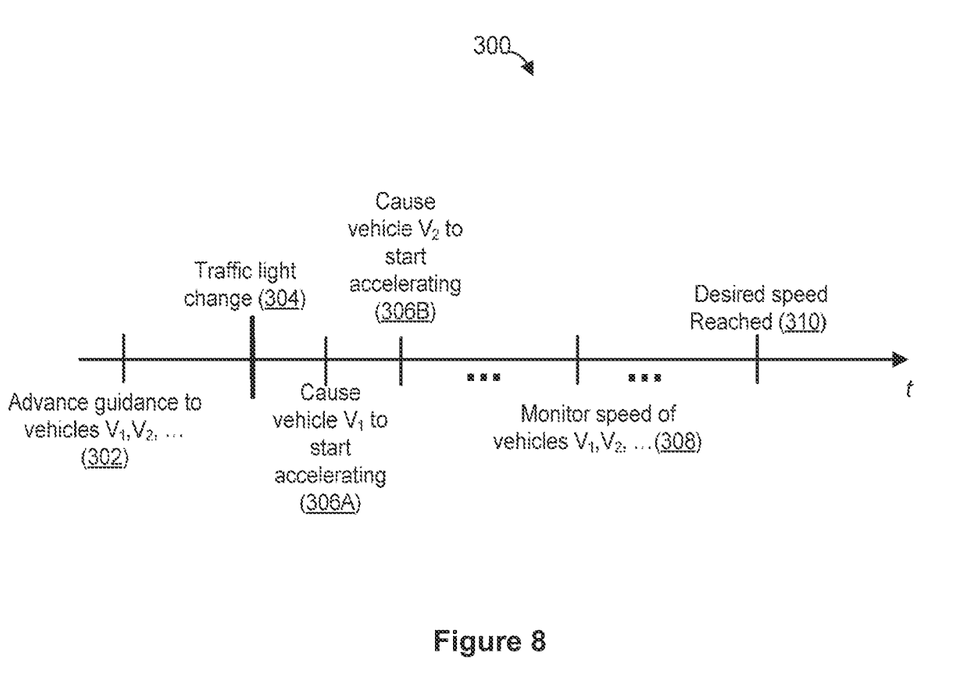
FIG. 8 illustrates an example timeline for providing guidance to vehicles being guided through an intersection.

For further clarity, FIG. 8 illustrates an example timeline 300 for providing guidance to a portable device operating in a vehicle. In this example scenario, each of the vehicles in the cluster is capable of receiving guidance, in the same or different formats, from the congestion control system. The event 302 can include advance guidance to vehicles regarding the traffic light. In one scenario, the advance guidance can include an indication of how much time remains until the traffic light changes to green. More generally, the advance guidance can include any potentially useful information such as an estimated amount of time it will take the vehicle to move through the intersection, an indication of how many vehicles are queued up at the intersection in front of the vehicle, etc.

The congestion control system then can notify each of the vehicles in the cluster of the traffic light change (event 304) and cause the vehicles to start accelerating (events 306A, 306B, etc.). In one scenario, each of the events 306A, 306B, etc. occurs at the same time, at the same time as or shortly after the event 304. In another scenario, the congestion control system spreads out in time the events 306 so as to account for the differences in the ability of the vehicles in the cluster to accelerate. For example, the truck in FIG. 2 may accelerate significantly slower than a lighter vehicle, and the congestion control system can delay the instruction to start accelerating for the vehicle positioned behind the truck.

The congestion control system can monitor the movement of the cluster through the intersection and, in some cases, provide updates to the corresponding vehicles and/or portable devices operating in these vehicles (events 308). As discussed above, the make-up of a cluster can change, some vehicle can accelerate faster or slower than expected, etc. When the desired speed is reached, or when the congestion control system determines that the cluster should be dissolved for another reason as discussed above (event 310), the congestion control system can stop providing guidance to the vehicles and, in some cases, notify the vehicles of the termination of this procedure.

Referring generally to FIGS. 1-8, it is noted that the term "intersection" can apply to any junction between roads such as a four-way road junction as shown in the drawings, a three-way junction (such as t-junction or a y-junction), a junction of more than four roads, a staggered junction, or a roundabout (also known as a traffic circle). These junctions can be controlled by traffic lights, stop signs, yield signs, or other types of road signs. The congestion control system can determine the type of an intersection and adjust the acceleration parameters accordingly. For example, for a traffic circle, the congestion control system can identify a cluster that includes vehicles that approached the traffic circle from different directions and currently stopped at different entry points of the traffic circle. The congestion control system can guide the vehicles in such a cluster to start accelerating at the same time to enter the traffic circle at the same time at different locations.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configured on a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 100 and 200 may include one or more function blocks, modules, individual functions or routines in the form of tangible computer-executable instructions that are stored in a non-transitory computer-readable storage medium and executed using a processor of a computing device (e.g., a server, a personal computer, a smart phone, a tablet computer, a smart watch, a mobile computing device, or other personal computing device, as described herein). The methods 100 and 200 may be included as part of any backend server (e.g., a map data server, a navigation server, or any other type of server computing device, as described herein), portable device modules of the example environment, for example, or as part of a module that is external to such an environment. Though the figures may be described with reference to the other figures for ease of explanation, the methods 100 and 200 can be utilized with other objects and user interfaces. Furthermore, although the explanation above describes steps of the methods 100 and 200 being performed by specific devices, this is done for illustration purposes only.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for reducing congestion at intersections through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for controlling vehicular congestion at intersections, the method comprising:
    detecting, by one or more processors, a group of two or more vehicles stopped at an intersection regulated by a traffic light, including determining that a head vehicle in the group is within a first distance from the intersection, and that each subsequent vehicle in the group is within a second distance from the head vehicle, wherein for each of the vehicles in the group, movement through the intersection in response to a change in a state of the traffic light is affected by movement of at least one other vehicle in the group;
    determining, by the one or more processors, a time when the state of the traffic light changes to allow the group of vehicles to start moving through the intersection;
    determining, by the one or more processors, one or more acceleration parameters for a certain vehicle in the group in view of potential and/or actual movement of the other vehicles in the group through the intersection;
    providing, by the one or more processors, guidance to a device operated by a driver of the certain vehicle regarding the determined one or more acceleration parameters, in accordance with the determined time.

2. The method of claim 1, wherein detecting the group of vehicles includes determining that all of the vehicles in the group are in a same lane.

3. The method of claim 1, wherein detecting the group of vehicles further includes determining that a distance between each two adjacent vehicles in the group is within a predefined threshold.

4. The method of claim 1, wherein detecting the group of vehicles includes using at least one of (i) a sensor of at least one of the vehicles in the group, (ii) a stationary camera configured to capture images of the intersection, a (iii) a camera operating in an unmanned aerial vehicle (UAV), or (iv) satellite imagery.

5. The method of claim 1, wherein determining the time when the state of the traffic light changes includes receiving a traffic light data from a network server that operates the traffic light, the traffic light data indicative of a current state of the traffic light and a time when the traffic light is scheduled to transition a different state.

6. The method of claim 1, wherein determining the time when the state of the traffic light changes includes using imagery captured in a camera operating in one of the vehicles in the group.

7. The method of claim 1, wherein determining the acceleration parameters includes determining a time when the vehicle is to start accelerating and a rate at which the vehicle is to accelerate.

8. The method of claim 1, further comprising:
    monitoring a movement of the group of vehicles through the intersection,
    adjusting the acceleration parameters in view of the movement of the group of vehicles, and
    providing updated guidance to the device operated by the driver, the updated guidance related to the adjusted acceleration parameters.

9. The method of claim 1, further comprising:
    determining a respective make and model of each vehicle in the group, and
    determining the acceleration parameters for the certain vehicle in the group in view of the makes and models of the other vehicles in the group.

10. The method of claim 1, further comprising:
    determining that at least some of the vehicles in the group are turning at the intersection, and
    determining the acceleration parameters for the certain vehicle in the group to prevent the vehicle from exceeding a threshold speed for turning.

11. The method of claim 1, further comprising:
    determining that at least some of the vehicles in the group are making a U-turn at the intersection, and
    determining the acceleration parameters for the certain vehicle in the group to prevent the vehicle from exceeding a threshold speed for a U-turn maneuver.

12. The method of claim 1, wherein providing the guidance to the device operated by the driver includes generating a vocalized instruction to be played back via a speaker of the device or a head unit of the vehicle.

13. The method of claim 1, wherein providing the guidance to the device operated by the driver includes providing a navigation instruction in advance of the traffic light changing to green.

14. The method of claim 1, wherein providing the guidance to the device operated by the driver includes providing a navigation instruction in response to the traffic light changing to green.

15. A portable computing device comprising:
    one or more processors;
    a short-range communication interface to communicatively couple the portable computing device to a vehicle;
    a long-range communication interface to communicatively couple the portable computing device to a vehicle; and
    a non-transitory computer-readable medium storing thereon instructions that, when executed by the one or more processors, cause the portable computing device to:
    detect a group of two or more vehicles stopped at an intersection regulated by a traffic light, including determining that a head vehicle in the group is within a first distance from the intersection, and that each subsequent vehicle in the group is within a second distance from the head vehicle, wherein for each of the vehicles in the group, wherein for each of the vehicles in the group, movement through the intersection in response to a change in a state of the traffic light is affected by movement of at least one other vehicle in the group,
    determine a time when the state of the traffic light changes to allow the group of vehicles to start moving through the intersection,
    determine one or more acceleration parameters for a certain vehicle in the group in view of potential and/or actual movement of the other vehicles in the group through the intersection,
    provide guidance to the portable device operated by a driver of the certain vehicle regarding the determined one or more acceleration parameters, in accordance with the determined time.

16. A network server comprising:
    one or more computing devices; and
    a non-transitory computer-readable medium storing thereon instructions that, when executed by the one or more computing devices, cause the network server to:
    detect a group of two or more vehicles stopped at an intersection regulated by a traffic light, including detect that a head vehicle in the group is within a first distance from the intersection, and that each subsequent vehicle in the group is within a second distance from the head vehicle, and wherein for each of the vehicles in the group, movement through the intersection in response to a change in a state of the traffic light is affected by movement of at least one other vehicle in the group, determine a time when the state of the traffic light changes to allow the group of vehicles to start moving through the intersection, determine one or more acceleration parameters for a certain vehicle in the group in view of potential and/or actual movement of the other vehicles in the group through the intersection.

17. The portable computing device of claim 16, wherein to detect the group of vehicles, the instructions further cause the portable computing device to determine that all of the vehicles in the group are in a same lane.

18. The portable computing device of claim 16, wherein to detect the group of vehicles, the instructions further cause the portable computing device to determine that a distance between each two adjacent vehicles in the group is within a predefined threshold.

19. The portable computing device of claim 16, wherein the instructions cause the portable computing device to:
    monitor a movement of the group of vehicles through the intersection;
    modify the group in response to vehicles entering or leaving a lane, and
    adjust the acceleration parameters in view of the modified group.

20. The portable computing device of claim 16, wherein the instructions cause the portable computing device to:
    determine a respective make and model of each vehicle in the group, and
    determine the acceleration parameters for the certain vehicle in the group in view of the makes and models of the other vehicles in the group.

* * * * *